United States Patent Office 3,564,065
Patented Feb. 16, 1971

3,564,065
FLUID BED CATALYTIC METHOD FOR PRODUCING TRICHLOROPROPANES
Albert Antonini and Emile Trebillon, Paris, France, assignors to Produits Chimiques Pechiney-Saint-Gobain, Neuilly-sur-Seine, France
No Drawing. Filed July 17, 1967, Ser. No. 653,606
Claims priority, application France, July 21, 1966, 70,264
Int. Cl. C07c 17/06
U.S. Cl. 260—659                               2 Claims

ABSTRACT OF THE DISCLOSURE

The process for producing trichloropropanes by reacting propene, hydrochloric acid and oxygen in a molar ratio of propene/oxygen/hydrochloride of 1/0.65 to 1.5/2.0 to 6.5 in which the reaction is carried out at a temperature within the range of 200° to 350° C. in the presence of a fluid catalyst containing a copper compound as the principal active agent on a catalyst support having a specific surface of 0.5 to 300 m.$^2$/g.

---

This invention relates to the preparation of trichloropropanes by chlorination of propene or mixtures of hydrocarbons containing propene.

It is known to effect catalytic oxychlorination of propene by means of hydrochloric acid and oxygen. The reaction products usually contain a very small proportion of trichloropropanes.

It is also known that the oxychlorination of propene is strongly exothermic. It is for this reason that the preponderant reaction products resulting from the oxidation of propene comprises CO and $CO_2$ as well as the formation of chloropropenes such as allyl chloride. Furthermore, instability of the catalysts and corrosion problems are encountered because of the need to make use of high reaction temperatures.

It is an object of this invention to provide a process which gives a high yield in trichloropropanes; which permits a high conversion rate of the reagents used; which makes use of moderate reaction temperatures; which constitutes an industrial process for obtaining trichloropropanes in which the stability of the catalyst is excellent; and in which the corrosion problems are greatly minimized.

In accordance with the process of this invention, propene, or a gas containing essentially propene, is reacted with hydrogen chloride and oxygen, or a gas containing hydrogen chloride and oxygen. The materials are reacted in a molecular ratio of propene/$O_2$/HCl of from 1/0.65 to 1.5/2.0 to 6.5. The reaction is carried out in a reaction zone at a temperature within the range of 200° to 350° C. in the presence of a fluid bed catalyst having its principal active agent in the form of a mineral copper compound deposited on fine particles of a catalyst support having a specific surface within the range of 0.5 to 300 m.$^2$/g. and preferably 10 to 80 m.$^2$/g. The time of contact of the reagents in the reaction zone, calculated with respect to the volume of catalyst, the temperature and pressure conditions used, is within the range of 1 to 80 seconds. The shorter contact time is used at the higher reaction temperatures while the longer contact times are used at the lower range of reaction temperatures.

Representative of the catalyst supports that may be used are materials such as silica, diatomaceous earth, alumina, clay, pumice stone, kaolin, graphite, activated carbon, and preferably complex silicates such as vermiculites and palygorskites.

It has been found that to obtain a high yield of trichloropropanes, use should be made of a catalyst support presenting a specific surface. In fact, it has been established that the yield of trichloropropanes increases progressively when the specific surface of the support impregnated with a catalytic agent increases, and that the yield tends toward an optimum when the specific surface is greater than the interval of 5 to 15 m.$^2$/g., the precise value depending upon the nature of the support used. The catalyst is employed in the form of fine particles having a grain size distribution within the range of 5 to 1500 microns and preferably 10 to 800 microns.

In accordance with the preferred practice of this invention, the reagents are introduced into a reaction zone in a molecular ratio of propene/$O_2$/HCl of 1/1.05 to 1.25/2.2 to 4.5 at a temperature within the range of 250° to 300° C. with a contact time of 5 to 40 seconds.

The catalyst usually contains additives, promoters and/or accelerators such as chlorides of alkali and alkaline earth metals and, possibly, chlorides of metals such as zinc, nickel, magnesium, thorium, zirconium or metals of the rare earths. Such additives, promoters and/or accelerators can be employed in an amount within the range of 5 to 25 percent by weight of the catalyst.

In practice, the preferred principal active agent is selected of the chlorides and/or oxychlorides of copper, although the chlorides and/or oxychlorides of iron and/or of chromium can be used, preferably in admixture with the chlorides and/or oxychlorides of copper.

In acordance with a further practice of the invention, it is advantageous to dilute the gaseous reagents with a nitrogen, an inert gas and/or water vapor for the purpose of assuming better control of the reaction temperature. An efficacious control of the reaction temperature permits the parasitic reaction of the combustion of propene to be minimized. It is also advantageous, from this standpoint, that the variation in temperature throughout the catalytic bed be maintained within the range of about ±10° C. and preferably to a range of about ±5° C. Utilization of a fluidized bed reactor permits these requirements to be effectively met.

Pressure is a factor that permits increase in the productivity of the process. Pressures within the range of 1 to 10 bars and preferably less than 7 bars can be used.

Finally, if it is desired to achieve maximum yield of trichloropropanes, it is desirable to separate the reaction products into useful components and to recycle the chlorinated by-products through the reaction zone, especially the monochloropropanes or the mono- and dichloropropanes, which can be mixed with advantage with the supply reagents and more particularly with the propene feed.

The following examples are given by way of illustration, but not by way of limitation, of the practice of this invention:

EXAMPLE 1

Attapulgite particles having a grain size of 40 to 400 microns and an apparent density of 0.8 are calcined at 400° C. to provide the catalyst support. This support, which has a specific surface of 48 m.$^2$/g., is impregnated with an aqueous solution of KCl and $CuCl_2$ such that, after drying of the catalyst, the latter contains 10% by weight of the cupric cation and 6.1% by weight of the potassium cation.

1400 ml. of catalyst are placed to a height of 800 mm. in a vertically disposed tubular reactor having a diameter of 65 mm. and a bottom wall formed of a fixed bed of glass balls having a diameter of about 2 mm. Electrical resistance heaters are arranged about the tubular reactor for exterior heating so as to be able to keep the temperature in the fluidized bed at 270° C. ± 2° C. in the regime state.

The following gaseous reagents are passed upwardly through the fixed bed of glass balls for diffusion in the fluid catalyst bed at an hourly rate of 4.13 moles of propylene, 24.0 moles of air and 10.95 moles of HCl.

At the outlet of the reactor, there is collected in condensers at 20°, 0° and —80° C., respectively, a total of 480 grams per hour of products which are liquid at 20° C. in which the liquid products have the following composition, by weight:

| | Percent |
|---|---|
| Trichloropropanes | 60.6 |
| Dichloropropanes | 30.3 |
| Tetrachloropropanes | 1.8 |
| Monochloropropanes | 0.1 |
| Monochloropropenes | 5.9 |
| Dichloropropenes | 1.2 |
| Propene (dissolved) | 0.1 |

The combustion products CO and $CO_2$ will be only 4.6 mole percent of the propene used. The total conversion rates of the propene and HCl are 98% and 86% respectively.

EXAMPLE 2

The same method as that of Example 1 is followed except that a reaction temperature of 260° C. ± 2° C. is used and the molar ratio of the reagents propene/$O_2$/HCL is fixed at 1/1.20/2.36 and the flow rate of propene remains unchanged.

There is obtained at the outlet of the reactor, 446 g./hour of products liquid at 20° C. having the following composition, by weight:

| | Percent |
|---|---|
| Trichloropropanes | 42.7 |
| Dichloropropanes | 50.1 |
| Tetrachloropropanes | 0.4 |
| Monochloropropanes | 0.2 |
| Monochloropropenes | 6.0 |
| Dichloropropenes | 0.5 |
| Propene (dissolved) | 0.1 |

The combustion products CO and $CO_2$ represent only 4.3 mole percent of the propene used. The total conversion rates of the propene and HCl are 95% and 87%, respectively.

EXAMPLE 3

In accordance with a variation of Example 1, use is made of a temperature of 280° C. ± 2° C. and a molar ratio of propene/$O_2$/HCl of 1/1.23/2.83 with the propene flow rate remaining unchanged. There is collected at the outlets of the reactor 485 g./hour of products liquid at 20° C. having the following composition, by weight:

| | Percent |
|---|---|
| Trichloropropanes | 65.9 |
| Dichloropropanes | 22.1 |
| Tetrachloropropanes | 5.4 |
| Monochloropropanes | Traces |
| Monochloropropenes | 4.9 |
| Dichloropropenes | 1.6 |
| Propene (dissolved) | 0.1 |

The combustion products CO and $CO_2$ represent 6.8 mole percent of the propene used. The total conversion rates of the propene are 98% HCl and 85%, respectively.

It will be understood that change may be made in the details of formulation and conditions of operation without departing from the spirit of the invention, especially as defined in the following claims.

We claim:

1. A process for producing trichloropropanes comprising reacting propene, hydrochloric acid and oxygen in a molar ration of propene/$O_2$/HCl of 1/1.05 to 1.25/2.2 to 4.5 by advancing the gaseous components through a reaction zone for reactive contact for a time within the range of 1–80 seconds at a temperature within the range of 200° to 350° C. in the presence of a fluid bed catalyst having as its principal active agent a mineral compound selected from the group consisting of the chlorides and oxychlorides of copper, iron and chromium in which the catalyst is on a catalyst support having a specific surface within the range of 0.5 to 300 m.²/g.

2. A process as claimed in claim 1 in which the reactive contact between the components is within the range of 5 to 40 seconds.

References Cited

UNITED STATES PATENTS

| 2,783,286 | 2/1957 | Reynolds | 260—659 |
| 3,461,084 | 8/1969 | Li | 260—659(oxy X) |
| 3,468,968 | 9/1969 | Baker et al. | 260—659(oxy) |

BERNARD HELFIN, Primary Examiner

J. A. BOSKA, Assistant Examiner